United States Patent [19]
Caillouet

[11] Patent Number: 5,303,533
[45] Date of Patent: Apr. 19, 1994

[54] CANE HARVESTER AND METHOD

[75] Inventor: Kenneth G. Caillouet, Terroborne Parish, La.

[73] Assignee: LaCane Manufacturing, Inc., Thibodaux, La.

[21] Appl. No.: 22,982

[22] Filed: Feb. 26, 1993

[51] Int. Cl.⁵ .............................................. A01D 45/10
[52] U.S. Cl. ...................................... 56/14.3; 56/14.5; 56/192; 56/DIG. 2; 198/304
[58] Field of Search .................. 56/14.3, 14.5, 192, 56/DIG. 2; 198/304, 314

[56] References Cited
U.S. PATENT DOCUMENTS

| | | | |
|---|---|---|---|
| 3,090,183 | 5/1963 | Thomson | 56/1 |
| 3,095,679 | 7/1963 | Pugh et al. | 56/14.5 X |
| 3,448,564 | 6/1969 | Chaufee | 56/14.3 |
| 4,165,596 | 8/1979 | Duncan | 56/14.3 |
| 4,232,775 | 11/1980 | Duncan | 198/304 |
| 4,380,281 | 4/1983 | Duncan | 198/304 |
| 4,483,130 | 11/1984 | Duncan | 56/14.3 |
| 4,744,452 | 5/1988 | Broussard | 56/14.3 X |

*Primary Examiner*—David J. Bagnell
*Attorney, Agent, or Firm*—Browning, Bushman, Anderson & Brookhart

[57] ABSTRACT

An improved two-row, four-wheel cane harvester includes first and second front carrier assemblies for carrying cut cane rearward in first and second passageways each passing between the pair of front wheels and then outwardly between the respective front and rear wheels. First and second rear piler assemblies are provided for receiving cane from the respective first and second carrier assemblies and moving the cane transversely before releasing the cut cane across a cut cane row spaced between the first and second rows. Third and fourth side piler assemblies are provided each selectively moveable between an opened position and a closed position, such that in the closed position each of the side piler assemblies receives cane from the respective first and second carrier assemblies and transfers the cane to the respective rear piler assembly, and in the opened position receives cane from the respective first and second carrier assemblies and releases cane on existing heap rows spaced outward from the respective front and rear wheels. A rear axle interconnects the pair of rear wheels and provides for reliable harvester sterring. The techniques of the present invention reduce the amount of cane that is left in the field and thus increase yield, while simultaneously increasing the reliability and improving the yield of the harvesting operation.

31 Claims, 3 Drawing Sheets

CANE HARVESTER AND METHOD

FIELD OF THE INVENTION

The present invention relates to techniques and machinery for harvesting cane. More particularly, this invention is directed to an improved harvester for erectable sugar cane, and to improve methods for harvesting such cane in a more efficient manner to obtain increased yields.

BACKGROUND OF THE INVENTION

Various types of sugar cane harvesters have been devised in the last 30 years, and the improved technology resulting from these harvesters has reduced both the length of time and manpower required to harvest and truck sugar cane to a processing plant. With increasing environmental regulations, frequent reminders of poor seasonal weather harvesting conditions, and the continual insistence of cane processors to reduce the handling of dirt and waste products, improved equipment and techniques will be required to meet the demands of the 21st century for those people depending on the sugar cane industry for their livelihood.

Cane harvesting equipment in use today generally has high maintenance costs resulting from the overall harvester design. Some sugar cane which is cut by the harvester is left in the field, thereby reducing profits. When cane is not cut and piled in a manner substantially transverse to the cane rows, the cane pick-up operation performed by the loaders cannot effectively convey the cane onto trucks, so that more manpower is lost. Harvesting equipment must be continually regulated and the harvesting operation modified by a skilled operator, thereby draining the operator's energy and taxing his patience. Critical areas of the harvesting operation and cane movement through the harvester cannot be easily viewed by the operator. The overall design of the harvester results in a cloud of dust and debris which generally surrounds the harvester when in use, thereby creating a substantial nuisance and safety concerns for the harvester operator.

Early cane harvesters were designed for single row harvesting. Advantages of two or multiple row harvesters were well known, two row harvesters have been commonly used for decades. U.S. Pat. No. 3,090,183 disclosed a two row cane harvester which deposits the cut cane on a common cut cane row (heap row) between the two growing cane rows. Cut cane can also be moved laterally with cane pilers to drop the cane on an existing heap row. Cane travels through the harvesters with a hook chain which moves in channels defined by deflector bars. The basic mechanism described in this patent for moving cane through a harvester is still in use today.

Tricycle-type cane harvesters have been proposed, with the center or third wheel riding either within the furrow between the two rows of cane being cut or behind one of the front wheels. U.S. Pat. Nos. 4,308,281 and 4,473,130 disclose such three wheel harvesters. Can harvesters of this type have inherent safety concerns involved in three wheel equipment, although tricycle-type cane harvesters are still widely used in the United States.

U.S. Pat. Nos. 4,165,596 and 4,232,775 also disclose four wheel, two row cane harvesters. The harvester according to the '596 patent is steered with differential drums and tackle for pivoting of front wheels, while the harvester of the '775 patent utilizes non-steerable front wheels and beelcranks connected to the steerable rear wheels for differential pivoting by the steering mechanism. In both embodiments, the cane moves from the front to the back of the machine in a pair of cane passageways generally in alignment with the two rows of growing cane, i.e., between the left side and right side wheels. One of the reasons for the relatively complex steering control mechanisms provided by these patents relates to the absence of a rear axle, which cut cane would otherwise have to pass up and over. Four wheel, two row cane harvesters have not been commercially accepted in the United States due to concerns associated with their overall design.

Another significant problem with prior art cane harvesters relates to the low velocity of the cut cane relative to the earth when the cane reaches the end of the first row conveyor system. The cane lacks uniform positioning when it reaches the end of the conveyor system, and when the pilers at the end of this system try to "trip" the cane across the rear of the machine, the cane frequently does not fall in a manner so that it is stacked substantially transverse to the cane rows. Harvester operators find it particularly difficult to trip the cane in the heap row transversely behind the machine, and accordingly a good amount of cane gets left in the field because it is not picked up by the loading equipment which relies on the assumption that the stacked cane will be generally transverse to the growing cane rows. Very significant problems are created when a loader operator, in an attempt to lift non-transverse cane, buries the loader piler into the soil and thus loads a good amount of mud and soil with the cut cane onto the transport, which is then hauled to the sugar mill and adversely affects refining operations. When harvesting the "fly" rows, existing cane harvesters also allow excess amounts of cane to be left in the field since the cane travels down relatively long conveyors and/or piler mechanisms positioned such that the cane travels in pathways substantially parallel to the growing rows on its way to being stacked in an existing cut cane row transverse to the growing rows. The greater distance cane must be moved from one point in order to be positioned properly for pick-up by the loaders, the greater the opportunity for the cane to drop out of the conveyor system and be left in the field. A still further problem with existing cane harvesters is that the operator cannot easily monitor either the tripping of cane when harvesting the center or heap rows (since the cane is tripped behind the machine), or the travel of cane in the carrier as it moves through the harvester to the pilers.

The design of prior cut cane harvesters also does not allow the harvester operator to easily monitor the height which the growing cane is cut off the ground. Accordingly, excess cane stubble is left in the field, particularly when cutting the first two rows of cane. The operator also cannot easily view the "downed" cane not picked up by the gathering assemblies and thus left in the field, and accordingly cannot reliably alter the operation of the front end gathering assemblies. The problem is in part dependant upon the overall design of the cane harvesters which, as previously noted, also results in large quantities of dust and debris following the harvester through the field. The successful operation of a cane harvester requires a significant amount of training and expertise, and even with this training, use of harvesting equipment is highly taxing upon the operator. One of the difficulties encountered by a harvester operator relates to the operator continually adjusting the speed of the main carrier mechanism through the harvester and the position of the base or foot of the cut cane in an attempt to control the cane as it is tripped across the rows.

These and further disadvantages of the prior art are overcome by the present invention, and an improved cane harvester is hereinafter disclosed.

SUMMARY OF THE INVENTION

Cane harvester, as with other types of farm machinery, are frequently manufactured for a particular type of crop. The present invention is particularly directed to a cane harvester for erectable sugar cane. Those skilled in the art will appreciate, however, that certain features of the present invention which may be adapted for harvesting non-erectable or tropical cane. Harvesting cane according to the present invention is a significant part of the overall operation of transferring growing cane from the field to a cane processing facility, and when used with improved cane loaders for picking up the cut cane and depositing the cane on trucks or trailers for transportation to the processing plant, will increase harvesting yields and reduce overall harvesting costs.

The cane harvester of the present invention is adapted for simultaneously harvesting at least two rows of cane, and includes a pair of front wheels and a pair of rear wheels each positioned on opposite sides of first and second cane rows. First and second center carrier assemblies within the cane harvester are provided for carrying cut cane rearward in respective first and second pathways each passing between the pair of front wheels and then outwardly between the respect front and rear wheels. First and second rear piler assemblies are provided for ultimately receiving cane from the respective center carrier assemblies and for releasing the cane in a common cut cane row (heap row) spaced between the first and second cane rows. Third and fourth side piler assemblies are also provided each selectively moveable between an open and a closed position. When the third and fourth side piler assemblies are in the closed and locked position, the side piler assemblies each serve as an extension of the first and second center carrier assemblies to transfer cane to respective rear carrier assemblies and then to the respective first and second rear pilers. When in the open position, each of the third and fourth side piler assemblies each receives cane from the respective first and second center carrier assemblies and releases cane on the existing cut cane rows spaced outwardly of the respective front and rear wheels. Since cut cane does not pass between the pair of rear wheels, the rear wheels may be mechanically interconnected by a substantially linear and conventional horizontal axis for conventional rear wheel steering, thereby reducing machine maintenance and enhancing the reliable sharp turning radius of the harvester.

According to the present invention, the first and second rear piler assemblies do not "trip" cane in a manner of the prior art with hopes that the tripped cane will fall transversely to the first and second growing cane rows. Instead, each of the first and second rear piler assemblies carries the cut cane transversely a distance of at least three-fourths the space between the first and second rows. By imparting a substantially constant transverse velocity to the cane, the cane can be released in a manner whereby it more reliably falls in the cut heap row with each of the cane stalks substantially transverse to the first and second growing cane rows. Each of the first and second rear piler assemblies may be pivotably moveable between a closed or short cane position wherein the pilers are each substantially transverse to the cane rows, and an open or tall cane position wherein each of the rear pilers are inclined with respect to the growing cane rows, thereby allowing the piling of cut cane having a length somewhat greater than the spacing between the wheels and thus the width of the heap row. Pivoting of the first and second rear piler assemblies may be automatically controlled in response to the cane topping height, thereby minimizing continual regulation of the rear pilers by the harvester operator.

Each of the side piler assemblies and the rear piler assemblies are preferably provided with their own drive mechanism, so that the rear piler assemblies may be deactivated while passing cane to the existing cut cane rows with the opened side pilers. The drive mechanism for the side pilers may also be the drive mechanism for the respective center carrier assembly which feeds each side piler. A locking mechanism is provided for interconnecting each of the side piler assemblies when in the closed position to a respective rear carrier portion upstream from the respective rear piler, and the transition between a closed side piler and the respective rear carrier portion occurs in a linear manner to minimize cane loss. The locking mechanism both aligns the position of the closed side piler assembly to the rear carrier assembly, and positions the pressure rail for the closed side piler assembly and the pressure rail for the downstream rear carrier assembly so that they move as a unitary assembly to assure reliable transfer of cane to the rear carrier assembly.

According to the method of this invention, two rows of cane may be simultaneously harvested by propelling a four-wheel cane harvester such that a pair of front harvester wheels are each positioned on opposite sides of the first and second cane rows while the pair of rear harvester wheels are similarly positioned and aligned behind the front wheels so that the inside edges of the narrower rear wheels are aligned behind the inside edges of the wider front wheels. The cane is gathered from the respective first and second rows, the cane tops are removed, and the cane cut from the ground. The cut cane is thereafter carried rearward within the harvester in a substantially erect position through respective first and second pathways each passing between the pair of front wheels and then outward between the respective front and rear wheels. Since the cane passes outward between the front and rear wheels, the operator can see the cane moving in the carrier and make alternations to improve efficiency, even when cutting the first two rows. Also, the operator can see the top of the stubble of the cut cane row and thereby evaluate the height of the base cutter and the performance of the gathering assemblies. A foot conveyor is provided on both sides of the harvester for positioning the base of the cut cane stalks as they move outward and between the front and rear harvester wheels. The cane is received from the respective carriers and is released in a common cut cane row or heap row spaced between the first and second cane rows when the side piler assemblies are closed. The cane is moved or carried by the rear pilers inward in a direction toward the first and second cane rows a distance of at least three fourths the transverse spacing between the first and second cane rows, thereby substantially increasing the likelihood that the cut cane will rest in a position generally transverse to the growing cane rows. At the appropriate time when cutting the fly rows, the side piler assemblies are opened to receive cane from the respective carriers and release the cane on existing cut cane rows each spaced outward from the respective front and rear wheels. The speed which cane moves through the pair of side piler assemblies may be regulated to control the final position of the cane when released on the existing cut cane rows.

It is an object of the present invention to provide an improved cane harvester and method which reduces the amount of cane left in the field while also facilitating the overall harvesting operation. It is further object of the present invention to provide a four-wheel, multiple-row harvester for simultaneously harvesting at least two rows of cane, wherein the harvester is provided with a pair of side pilers which, when opened, pass the cut cane to existing cut cane rows, and when closed, locked, the pressure rails interconnected, and the rear carriers activated, pass the cane to the respective rear carrier assemblies and to pilers behind the rear wheels, which then preferably carry the cane a substantial distance in a direction generally transverse to the first and second rows before releasing the cane. Still a further object of the present invention is to provide an improved cane harvester suitable for depositing cut cane behind the harvester, wherein the cane harvester is provided with a substantially horizontal rear axle interconnecting the rear wheels, so that cane is not passed between the rear wheels but rather outward and around the rear wheels and then back between and behind the rear wheels when piling cut cane in the heap row behind the harvester.

It is a feature of this invention that each of the side pilers are provided with an independent drive mechanism, so that the operation of the rear pilers may be terminated when the side pilers are opened for depositing cane on the existing cut cane rows spaced outward from the harvester wheels. It is a further feature of this invention that a lock mechanism is provided for aligning the side piler with the respective rear carrier assembly upstream from the rear pilers, and for interconnecting the pressure rails of the closed side piler and the downstream rear carrier assembly. This transfer preferably is made in a linear manner to reduce the loss of cut cane when being transferred to the rear carrier assembly. It is further feature of the invention that the rear piler assemblies carry the cane transversely at a substantially constant velocity a distance of at least three fourths the transverse space between the first and second cane rows before releasing the cane. The rear pilers are preferably pivotable, and their pivotable position may be automatically controlled in response to the height at which the cane is topped.

Yet another feature of the invention is the use of cane steering bars located at the final turn for each of the rear pilers. These steering bars support the foot of the cane as it moves traversely across the furrow in the field as the cane is being carried laterally inward to the top of the row being harvested, and deflects cane which is either broken beneath the rear piler carrier or which was to short for the carrier but is tangled in the leaves of the cane which is carried by the rear piler. The rear piler steering bars thus support the foot of the cane to increase desired cane positioning across the rows, and minimizes separation and loss of broken cane from the carried cane, thereby increasing the likelihood that even broken cane will become picked up by the loader.

It is an advantage of the present invention that a four-wheel cane harvester is provided which has substantially reduced maintenance costs compared to prior art harvesters. The length which cane must travel along a carrier mechanism when harvesting the fly rows is reduced, thereby minimizing the likelihood of lost cane. The steering mechanism for the cane harvester of the present invention allows the operator to easily turn the harvester on a relatively short radius, thereby minimizing the time required to position the harvester between the ends of one pair of rows and the next pair of rows to be harvested. The design of the cane harvester according to the present invention allows dust and debris to substantially trail the harvester rather than engulf the harvester, thereby enhancing the environment for the operator and minimizing safety concerns due to fire. The cane harvester of the present invention enables the cane operator to more easily control the harvesting operation and visually see those portions of the harvesting operation which should be monitored.

The harvester of the present invention thus overcomes much of the reluctance of cane farmers to place harvested cane on the ground, since the difficulty associated with picking-up the cane and the likelihood of picking up a significant of mud are both minimized by properly positioning the cane. Since cane is "carried" for each of the two rows being harvested even when the cane is laid behind the harvester, the cane is more uniformly stacked in a manner generally traverse to the harvested rows. The harvesting operation also does not result in a tire rolling in the furrow between the two harvested rows, thereby further reducing the likelihood that the loader will pick-up significant amounts of mud with the harvested cane piled behind the harvester.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
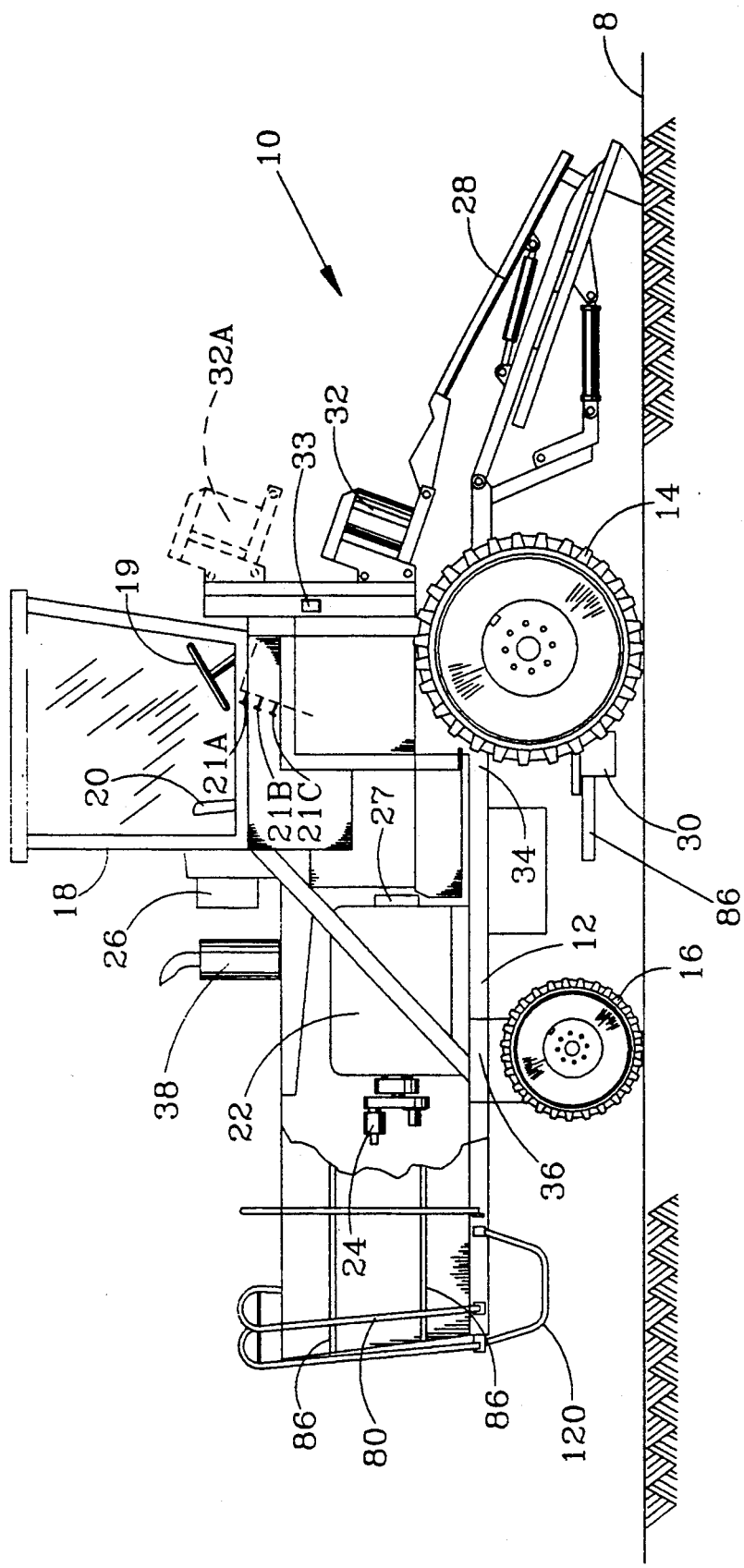
FIG. 1 is a side view of a two-row, four-wheel cane harvester according to the present invention.

FIG. 1 generally depicts a cane harvester 10 according to this invention for harvesting erectable cane. The harvester includes a frame assembly 12 having a front end with a pair of large front wheels 14, and a rear end with a pair of smaller rear wheel 16. The inside edge of each rear wheel may be substantially aligned with the inside edge of the respective larger diameter and wider front wheel. As explained further below, the harvester 10 is adapted for simultaneously harvesting at least two rows of cane, and both the front and rear wheels are spaced for riding in furrows on opposite sides of the two cane rows, so that a frame centerline which generally divides the left side from the right side of the harvester is substantially aligned with the furrow between the two rows of cane being harvested.

The harvester frame assembly 12 includes a conventional cab 18 having an operator seat 20. The harvester is self propelled by an internal combustion engine 22 which is generally positioned over and between the rear wheel 16. A steering wheel 19 within the cab 18 is provided for steering the harvester as explained subsequently. The engine 22 powers a plurality of hydraulic pumps, and a respective pump 24 is simplistically depicted in FIG. 1. One of the advantages of the harvester 10 according to this invention is that the overall harvester design results in dust and debris following rather than generally engulfing the harvester as it moves through the cane field. The air which is drawn into the intake 26 is relatively clean, since the intake is positioned directly behind the cab and relatively high off the ground. This air is then passed to a conventional powered fan and radiator assembly 27, wherein the air cools water passing through the radiator to maintain the engine relatively cool. Once the air passes through the fan and radiator assembly 27, it is discharged rearward pass the motor 22, and most importantly is discharged in a direction which is opposite to the movement of the harvester. The large volume of relatively clean air will thus be used to cool the engine 22, with this large volume of cooling air blowing debris rearward and away from the forward movement of the harvester. Also, the cane is moved between the front tires and the rear pilers with carriers positioned laterally outward from the rear tires, thereby reducing the likelihood of fires by not passing cane in carriers positioned below and adjacent the harvester engine. Cane is thus moving in an area which is not "confined" between the tires of the harvester, thereby minimizing fire risks while blowing dust and debris rearward, so that the harvester operates in a generally clean environment.

The harvester 10 includes a pair of conventional cane gatherer assemblies 28 each at the harvester front end for collecting and positioning cane gathered from respective rows being harvested. One or preferably two vertically adjustable cutter assemblies 30 are positioned slightly rearward of the front wheels 14 for cutting a base of the collected and positioned cane to separate the cane from the ground. One or preferably two topping assemblies 32 are also provided at the harvester front end for removing tops from the collected cane. Those skilled in the art will appreciate that the height of the topping assembly is adjusted by the operator as a function of the condition of the growing cane, and the dashed lines at 32 A represent the topper assembly in an upper position. The individual gatherer assemblies are connected to the topper assembly and thus move with the adjustment of the topper assembly, although the position of the gatherer assemblies are not shown in dashed lines for clarity of the depicted components. The gatherer assemblies, topper assemblies and cutter assemblies used in the harvester of the present invention are functionally and structurally similar to the respective assemblies in the prior art harvesters. Those skilled in the art will appreciate that various conventional control members 21A, 21B, and 21C are provided within the cab 18 so that the operator may vary the height of the topper assembly, the height of the cutter assembly, the speed of chain assemblies within the gathering assemblies, and the other components described below. A sensor 33 is also shown in FIG. 1 for determining the height of the topper assembly 32 relative to the ground 8 and thus the harvester frame 12. As explained subsequently, signals from the sensor 33 indicative of the topper assembly height may be used to automatically control pivoting of the rear harvester pilers.

Figure 2:
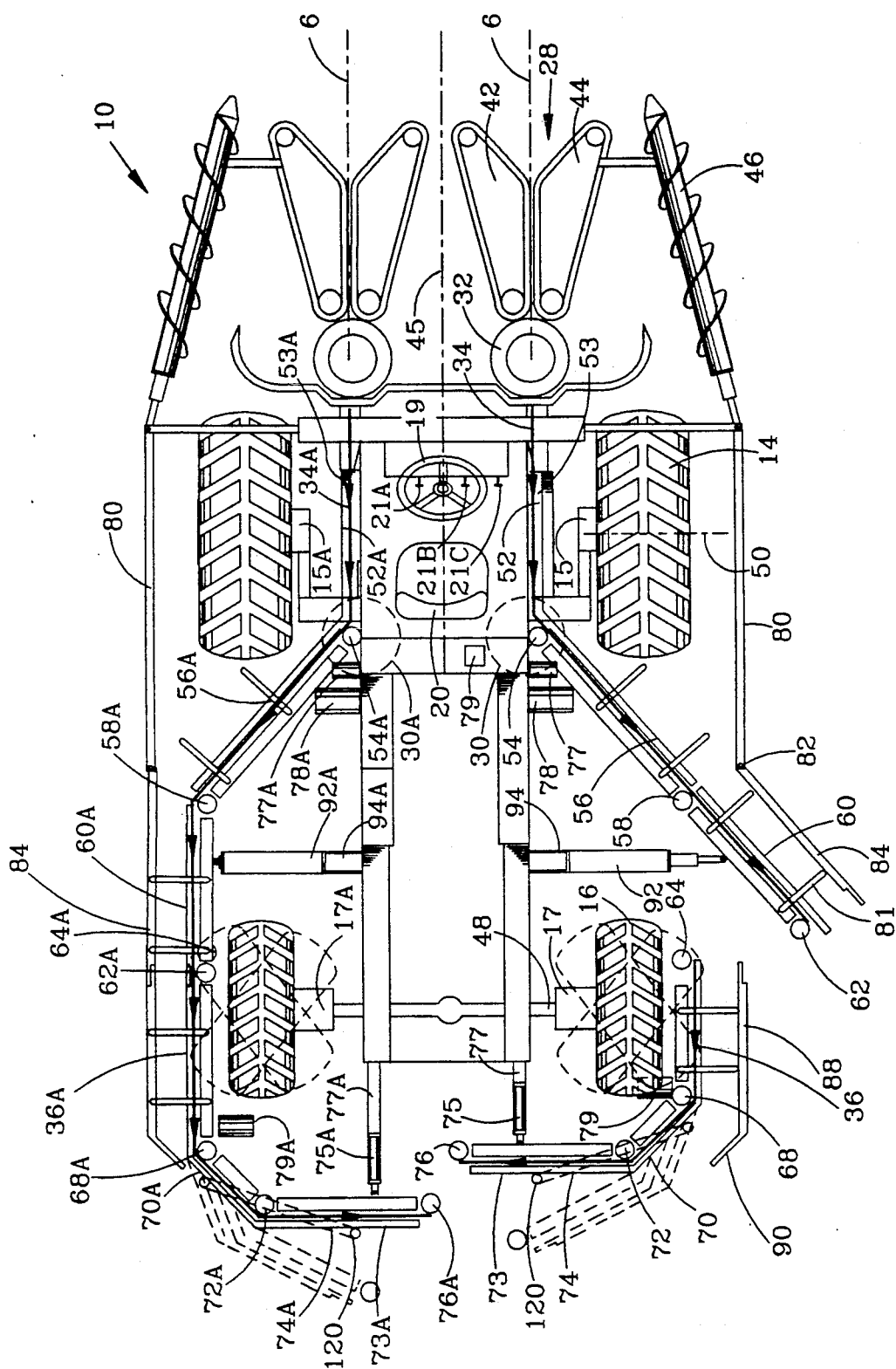
FIG. 2 is a simplified top view of the cane harvester generally shown in FIG. 1, with one of the side pilers shown in a closed position on the other of the side pilers shown in an opened position.

Referring to FIGS. 1 and 2, the harvester 10 includes first and second carrier assemblies 52 for carrying cane rearward between the pair of front wheels 14, then outward between the respective front and rear wheels. A rear carrier assembly or carrier portion 36 is positioned outward of each of the rear wheels 16 for carrying cane to respective rear piler assemblies discussed subsequently. Each carrier assembly comprises a conventional closed loop chain which moves relative to a pressure rail. The cane stalks are thus moved by the chain and slide against the pressure rail in a manner well known in the harvester industry. The chains for the carrier assemblies are not depicted, and the lead lines for the carrier assembly reference numerals in FIG. 2 point to the respective pressure rails. As the cane is passed to the rear piler assemblies, cane brush pipes 84 push and bend cane in the "fly" rows adjacent the two rows being harvested, so that the harvester will cut cane in two initial rows without interfering with cane still in the field and on the sides of the harvester. Much of the brush pipe assembly is removed in FIG. 1 for clarity of the depicted components.

FIG. 2 is a top view of the primary components of the harvester 10 according to this invention. The cane gathering assemblies 28 for each of the two-rows being harvested includes a pair of chain drive gathers 42 and 44. The position of the pair of topper assemblies 32 relative to the gathering assemblies is more clearly depicted in FIG. 2. The position of the bottom cutters 30 and 30A is generally shown in FIG. 2, and these cutters preferably cut the cane at the end of the center carrier assemblies. A pair of powered spirals 46 on the outward sides of each of the gathering mechanisms 28 lift and move cane in the adjacent fly rows around the sides of the harvester while it travels through the field, so that the wheels do not ride over fallen cane not yet harvested. FIG. 2 also generally depicts the frame centerline 45 which separates the left side from the right side of the harvester. The centerline 6 for each of the two rows being harvested is thus parallel to and on opposite sides of the harvester centerline 45. Unless discussed below, it may be assumed that the harvester 10 is substantially symmetrical about centerline 45.

The carrier assemblies and the pilers depicted in FIG. 2 move the cane along a flow path shown by the solid line 34 and 34A. Each of the first and second carrier assemblies includes a front carrier portion 53, 53A which carries the cane between the front tires in a first pathway generally aligned with one of the two rows 6 being harvested. A sprocket assembly generally depicted by 54, 54A then diverts the cane to angled carrier portions 56, 56A which pass the cut cane in an angled pathway extending between the respective front and rear wheels 14, 16. At the same time the cane is diverted by 54, 54A, it is cut by the pair of cutter assemblies 30. A pair of side piler assemblies 60, 60A mounted outside the cane rows 6 receive cane from the respective angled portions 56 and 56A, and are pivotable from an open position as shown at 60 to a closed position as shown at 60A. Although the side piler assemblies are shown in different positions in FIG. 2, it should be understood that both side pilers are generally either opened or closed for passing cut cane to either existing cut cane rows or to a heap cane row to be formed behind the harvester, respectively. Hydraulically powered drive units 78 and 78A are provided for driving a chain which carries cane through the front carrier portions 53 and 53A, through the angled carrier portion 56, 56A, and through the opened or closed side pilers 60, 60A. The sprockets 54 and 54A each represent a cluster sprocket assembly, including an upper sprocket and a lower sprocket rotatably connected by a common shaft. A top chain (not shown) rotates between a respective front end sprocket (also not shown) and the top sprocket. A lower chain (not shown) rotates between the lower sprocket of each assembly 54 and the sprockets 58 and 62 discussed subsequently. This technique thus effectively allows the flow path of moving cane shown by the lines 34, 34A to extend outward and between the front and rear wheels and yet remain on the outside of the sprockets 54, 54A.

When a side pilers are in their closed position, these assemblies do not function as pilers, but rather serve as an extension of the center carrier assembly to convey cane to the respective rear carrier assemblies 36, 36A, which are also represented by depicted pressure rails. Each rear carrier assembly 36, 36A then passes cane to the respective rear pilers 74, 74A for depositing the cane behind the harvester in a common heap row with the cane stalks being laid generally transverse to the two rows being harvested. The cut cane thus moves through a closed side piler within a path spaced outward from the harvester wheels. Each rear piler 74, 74A consists of a first portion 70 which receives cane from the rear carrier assembly 36, and a second portion 73. Each rear piler pivots about the center of the respective sprocket 68. As explained subsequently, each rear carrier assembly 36 remains fixed to the harvester frame assembly 12 and generally aligned with the closed side piler assembly 60, and is thus generally parallel to but opposite centerline 45 with respect to the rear wheel 16. The drive unit 78, 78A thus moves the cane from the beginning of the carrier assemblies past the sprockets 54, 54A and 58, 58A, and to the sprocket 62, 62A at the end of the side pilers, where the cane is then either released (when the side pilers are open) or transferred to the separately driven respective rear carrier assembly 36, 36A and then to the rear pilers 74, 74A. A separate hydraulic drive unit 79, 79A is provided for driving the chains which pass cane through the respective rear carrier assembly 36, and through the respective rear piler 74. It should be understood that these drive units 79, 79A may thus be deactivated when the side pilers 60 are opened for passing cane to existing cut cane rows each outward of the wheels 14, 16, thereby minimizing wear on the rear carrier assembly and rear pilers.

The hydraulic drive motor 79 thus drives a conveyor chain which passes by the sprockets 64, 68, 72, and 76, while a similar drive unit 79A drives the chain which passes by the sprocket 64A, 68A, 72A and 76A. The rear carrier assemblies each extend between the sprockets 64 and 68, and are generally aligned with the respective row of cane being harvested but spaced outside the rear wheel. It may be seen in FIG. 2 that the first and second carrier assemblies 52, 52A and the rear carrier assemblies 36, 36A may each be structurally identical. The rear pilers 74, 74A are spaced slightly apart along the length of centerline 45, e.g., by two feet, due to the length difference between the rear carrier assembly 36 and 36A, so that cane does not fall from one rear piler onto the other rear piler. Either the left side or the right side of the harvester may have the longer rear carrier assembly.

When the side pilers 60, 60A are within their closed position, the sprockets 58, 58A each serve to direct cane from the angled portions 56, 56A to portions 60, 60A which are each generally parallel with the central axis 45. In order to successfully transfer cane from the closed side pilers to the rear carrier portion 36, 36A, the cane is passed in a substantially straight line path. Accordingly, FIG. 2 depicts portion 60A and 36A generally aligned with each other for passing cut cane in a straight line path past the rear wheels 16, and may be seen that this path is outward of each of the rear wheels. It should be understood that when the pair of side pilers are closed, the sprocket 62 at the end of the side piler is generally positioned above or below and slightly rearward of the front sprocket 64 of the respective rear carrier assembly 36, thereby allowing the transfer of substantially erect cane once the pressure rails are interconnected (as explained subsequently) from the closed side piler to the separately driven rear carrier assembly and rear piler without significant loss or dropping of cane.

Due to the design of the cane handling system for the harvester 10, the harvester may utilize a conventional and highly reliable solid and substantially horizontal rear axle 48 for pivoting the rear wheels 16. Rear wheel steering is preferred by cane growers since the area required to turn the harvester around when completing two rows and positioning harvester for the next two rows is minimized, thereby allowing full land utilization without requiring the harvester operator to spend time with repeated backup and turning operations.

Cane passes between the front wheels and thus past the central axis 50 for the pair of front wheels 14, but pivoting of the front wheels relative to the frame 12 is not required. Each front wheel 14, 14A may be separately powered by a hydraulic motor, which are schematically shown at 15, 15A in FIG. 2. Motors 15, 15A thus receive pressurized fluid from one of the pumps 24, which in turn is powered by diesel engine 22. Rear wheels 16 are similarly powered by hydraulic motors 17. Conventional pivoting of the rear wheels is thus obtained utilizing a solid axle and associated steering components well known in the industry. The solid rear axle 48 preferably oscillates about a center pivot aligned with 45 to accommodate varying field conditions. Conventional steering control mechanisms are provided between the steering wheel 19 and the solid axle 14 to control pivoting of each of the rear wheels in the manner suggested by FIG. 2.

As previously noted, powered spirals 46 pick-up cane in the fly rows while the initial two rows are being harvested, so that the harvester wheels 14, 16 do not ride upon cane in the fly rows. The cane in these fly rows is thus pushed or bent away from the harvester, and is kept bent away by brush pipes 80 permanently mounted to the outside of the front tires 14. As those skilled in the art appreciate, these brush pipes are not required when harvesting the fly rows, since the two rows on either side of the fly rows have already been harvested, and cut cane already is positioned in heap rows on each side of the harvester when harvesting the fly rows. Brush pipes 84 are mounted to and supported to by side pilers 60, and are pivotably connected to the brush pipes 80 at 82. When side pilers 60 are open, the brush pipes thus serve no purpose. When the pair of side pilers are closed, the brush pipes 84 serve as a linear extension of the permanently mounted brush pipes 80. The rear brush pipes 88 are permanently mounted to the frame outside of the respective rear wheels 16. The rear end of the brush pipe 84 overlap with the front end of the brush pipes 88, so that cane is prevented from passing between the brush pipes and into the carrier system of the harvester when harvesting the initial rows. A deflector pipe 90 may be fixed to the rear end of each of the pair of brush pipes 88. These brush pipes may be physically held away from the respective closed side pilers and the rear exterior portion 66 by generally J-shaped tubes 81, which allow some flexing and thus limited transverse movement of the brush pipes with respect to the frame of the harvester.

Referring still to FIG. 2, the cane conveying system within the harvester of the present invention has significant advantages over prior art harvesters apart from allowing the use of a reliable solid axle for rear wheel steering. Prior art harvester operators have long found it difficult to successfully trip the cane in the common cut cane row behind the harvester, since the cane being tripped has no significant transverse velocity. According to this invention, the cane is carried or transported by each of the rear piler assemblies 74 at a substantially constant velocity which may be controlled by controller 21A to regulate the speed of the drive units 79, 79A, and simultaneously the drive units 78, 78A. Cane is thus carried inward (toward centerline 45) over a substantial transverse distance before being released, and preferably a distance of at least three-quarters the spacing between the first and second cane rows 6. Once the cane travels by sprocket 68, 68A, it moves in a direction perpendicular to and thus transverse to the cane rows 6, and this movement is at least three-fourths the spacing between the cane rows. This action allows the cane to be released to the heap row in a reliable manner so that it will be stacked substantially transverse to the cane rows 6, and accordingly may be easily picked by a loader. The actual distance the cane moves transversely before being released by the rear piler assemblies is the transverse spacing between the rear carrier assembly 36 and its release point on the respective piler. The preferred transverse spacing as described above may thus be obtained by both transverse movement of the cane within the portions 70 and 73 of each rear piler assembly 74. When the side pilers are opened, the desired transverse movement of the cane is also obtained, although the desired transverse piling of cane when cutting the first rows has long been a more significant problem than when cutting the fly rows.

According to this invention, each of the rear pilers pivot about the center of the sprocket 68, 68A to allow pivoting of each rear piler assembly 74, 74A with respect to the frame. This pivoting motion may be controlled by a respective hydraulic cylinder 75, 75A each secured to the end of a bracket 77, 77A affixed to the frame 12. When harvesting relatively short cane having a top length less than the transverse spacing between the harvester wheels, hydraulic cylinders 75, 75A may each be in a retracted position so that the rear piler 74, 74A can be maintained in a closed or short cane position substantially transverse to rows 6, as shown in solid lines in FIG. 2. In this position, cane desirably travels in a direction perpendicular to the centerline 45 and thus the travel of the harvester before being released, so that the piled cane is transverse to the growing cane rows 6. When harvesting tall cane having a topping height greater than the transverse spacing between the harvester wheels, the cylinder 75, 75A may each be extended so that the cut cane will preferably not be deposited exactly transverse to the rows 6, but rather at a slight angle generally corresponding to the angle of the rear piler portion 73. This procedure allows whole cane stalk which is longer than the transverse spacing between the harvester wheels to be stacked in a common row behind the harvester, so that the stacked cane will not be rode upon when the harvester subsequently cuts the fly rows. Controls 21B in the cab 18 may thus be used to control actuation of the cylinders 75, 75A to different extended or retracted positions so that the rear pilers will be pivoted as desired. Alternatively, controller 9 may receive signals from the sensor 33 indicative of the height of the topper assembly 32 and thus the length of the topped cane above the carrier, and controller 9 may output signals which automatically control extension and retraction of the cylinders 75, 75A so that the rear piler assemblies will automatically pivot to a more open position when cane traveling in the carriers is above a pre-determined height, and return to the closed position when cutting cane less than this predetermined height. FIG. 2 depicts the rear pilers 74, 74A in a substantially open position in dashed lines. If the rear pilers were "opened" much farther than that depicted in FIG. 2, the cane stacked back behind the harvester would be so inclined with respect to its desired transverse position that pick-up by the loader would become difficult. It should be understood that even when the rear piler assemblies 74, 74A are opened so that they are not positioned perpendicular to the rows 6, cane is carried within each of the rear pilers so that still moves a substantial distance in a direction transverse to the rows 6, and accordingly the cane is carried by the rear pilers in the desired manner of the present invention rather than being tripped behind the machine. During this carrying action, the foot of the cane typically engages the hill or mound of the cane row, and accordingly this engagement causes the foot to lag behind the top of the cane, thereby contributing to the cane top being carried transversely with respect to the foot and facilitating release of the cane so that it will rest in a position substantially transverse to the rows 6.

When cutting the fly rows, cane is passed to the opened side piler assemblies 60, and the drive units 79, 79A are deactivated. The opened side pilers are substantially inclined relative to the rows 6 (preferably at an angle of approximately 45 degrees), and accordingly the cane is also carried by the side piler assemblies in a direction which has a significant component transverse to the spacing between the two rows being harvested. The side piler assemblies thus also carry cane in a direction substantially transverse to the two rows being harvested before releasing the cane, rather than attempting to trip the cane across a cut cane row.

Whether the side pilers 60 are opened or closed, is a further feature of this invention to provide a foot conveyor for positioning the foot of the cut cane stalks as they move along the angled carrier portions 56, 56A and between the front and rear tires. This foot conveyor lies directly beneath the angled conveyor portions 56, 56A and is thus not visible in FIG. 2, but its vertical position is generally shown in FIG. 1 by the designation 86. The foot conveyors on each side of the harvester thus maintain the cane in a substantially erect position as it is passed between the sprockets 54 and 58. The foot conveyors 86 not only minimize the likelihood of cane being inadvertently released by the conveyor system, but also prevent cut cane from bouncing back into engagement with the cutter assemblies 30, and make it much easier for the harvester operator to view the cane during the cutting operation and while the cane is being carried through the harvester. When harvesting, the foot conveyors 86 add some redundancy to the carrier system for properly stacking cane in the fly rows to the side of the harvester. The overall harvester design of this invention results in little scrap being left in the field when harvesting fly rows, since the foot conveyor ensures that all the cane, even that cane which is not supported by the carrier chain, is moved to the heap row and is laid at an angle which will facilitate loading the cane without excessive mud. Separate drive motors 77, 77A are preferably used to drive the foot conveyor 86 positioned beneath the inclined portion 56. The drive motors 77, 77A, 78, 78A, and 79, 79A are all preferably synchronized to operate the conveyors of the same speed at any point in time.

When the side piler assemblies 60 are closed, the harvester operator can thus view the position of the cane within the carrier system by looking in a direction either left or right and between the front and rear wheels. By studying the position of the cane within the carrier system of the harvester, adjustments can be made by the operator to facilitate the efficient harvesting operation in a manner which was not possible according to prior art harvesters. Since the cut cane is moved outward of the rows 6 immediately after being cut, the operator can see the cane stalk and adjust the cutting height of the cutter assemblies 30. The harvester operator can also easily detect if downed cane is not being picked up by the cane gatherers, and accordingly make changes to the operating height of the gatherers and/or the speed of the gathering chains to more efficiently pickup the downed cane. When cutting the fly rows and the side piler assemblies are opened, the operator can also look either left or right and easily view the cane as its transported or carried by the opened side pilers, and can also more easily view the position of the cane as it is released on the existing cut cane rows on either side of the harvester. In order to more desirably control the resting position of the cut cane when stacked on the existing cut cane rows, the operator may utilize a conventional control member 21C to effectively control the speed of the hydraulic drive motors 78, 78A and thus the speed of the cane within the side pilers. In this manner, the transverse velocity component of the cane as it is carried by the side pilers relative to the velocity of the harvester 10 as it moves through the field can be independently controlled.

Cylinder assemblies 92, 92A as shown in FIG. 2 each have one end pivotably secured to the frame through a respective bracket 94, 94A, and have their other end pivotably connected to a respective side piler 60. The extension and retraction of the cylinders 92, 92A may be easily obtained by regulating a control within the cab 18, thereby powering the side pilers between their opened and closed positions.

Figure 3:
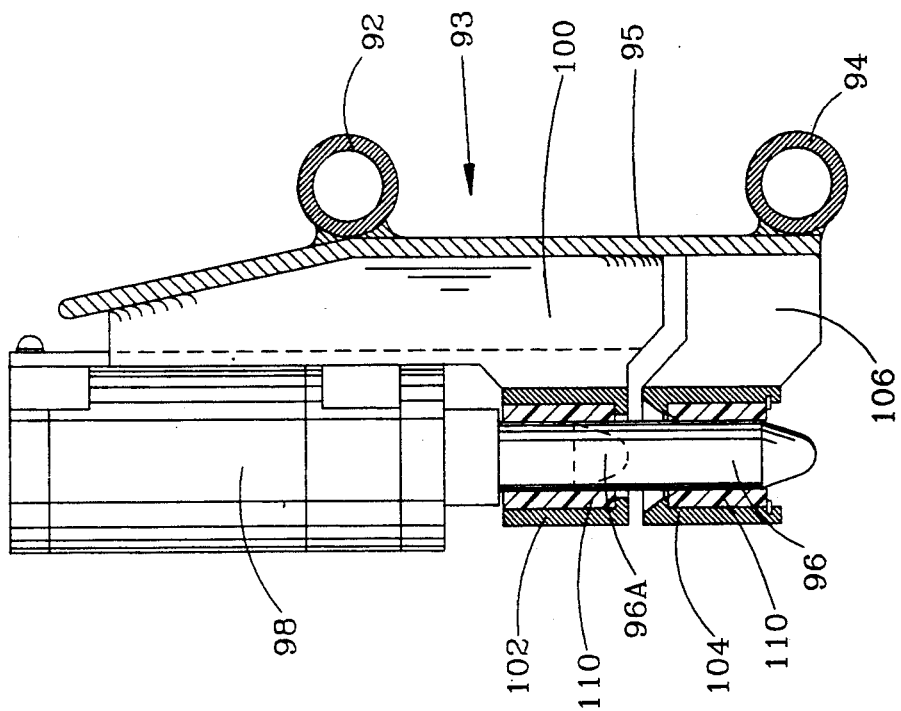
FIG. 3 is an end view of a suitable mechanism for interconnecting a closed side piler with a rear carrier assembly according to this invention.

Movement of the pressure rail for the closed side piler 60 in a horizontal plane must be at least substantially fixed relative to the pressure rail for the rear carrier assembly 36 and there can be no significant gap in the pressure rail at this point in order to reliably transport can from the closed side piler to the rear carrier assembly. Horizontal movement of any one pressure rail for a carrier system in a direction transverse to centerline 45 is permissible, and in fact may be desirable to accommodate different cane stalk diameters and varying quantities of cane being transported through the harvester. The arches through which the cane travels and to which the pressure rails are attached do not allow any significant vertical movement of a pressure rails. Adjoining ends of the pressure rails cannot move horizontally with respect to one another, (neither lateral movement nor longitudinal movement between pressure rail ends in a direction parallel with centerline 45 is permissible), or cane will either get "hung-up" in the system or will drop to the ground. To accomplish this objective and referring to FIGS. 3 and 4, a pressure rail 93 for the rear carrier assembly 36 may consist of pair of horizontally spaced tubulars 92, 94 connected by a steel plate 95. Hydraulic cylinder 98 is mounted to the pressure rail 93 for the rear carrier assembly 36 by bracket 100, and thus remains at a substantially fixed position. A donut-shaped guide 102 is fixed to the bracket 100 and receives pin 96 of the hydraulic cylinder 98. A lower donut-shaped guide 104 is supported by bracket 106, which in turn is connected to a similarly configured pressure rail 108 for the respective side piler 60. Each donut guide may include a bushing 110 to facilitate insertion and retraction of pin 96.

Figure 4:
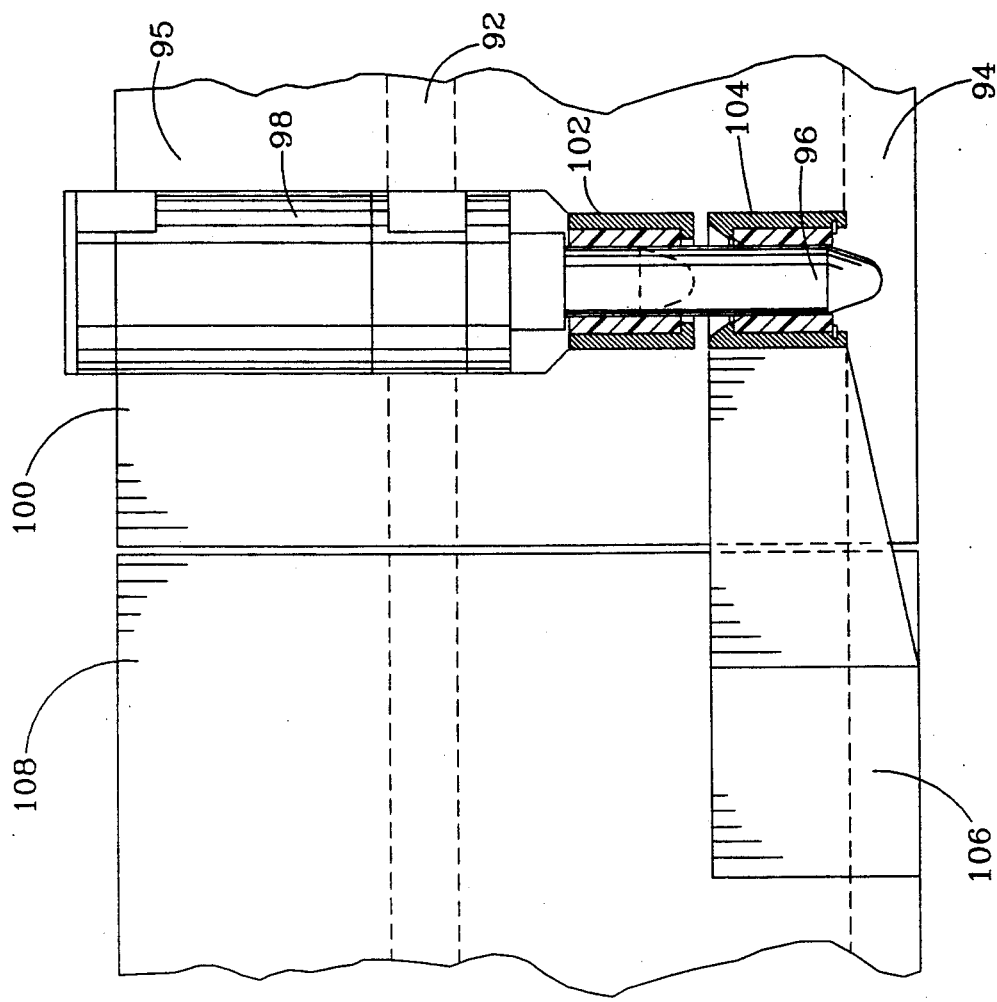
FIG. 4 is a side view of the adjoining ends of a pressure rail for a closed side piler interconnected with a pressure rail for a respective rear carrier assembly, so that these pressure rails move horizontally in unison to reliably transfer cane.

Hydraulic cylinder 98 may be activated by the operator to vertically move the connecting pin 96. When the hydraulic cylinder 98 is retracted so that the pin is in the position 96A, the guide 104 and bracket 106 are free to move in a horizontal plane relative to the bracket 100, and accordingly the side piler may be moved to an opened position. When the hydraulic cylinder 98 is extended so that the pin 96 passes through both the guides 102 and 104, the lateral positions of the brackets are fixed, and accordingly the position (in a horizontal plane) of the end of the closed side piler is fixed with respect to the beginning of the rear carrier assembly 36, so that cane can be successfully transferred in a linear path from the closed side piler to the rear carrier assembly. A gap between 100 and 108 is shown in FIG. 4 for clarity of the separate components, although when the pin 96 and donut member 104 are engaged, the remaining gap, if any, between the end of the side piler and the beginning of the rear carrier portion should be slight, e.g., less than about 0.010 inches. It should also be understood that vertical movement between the brackets 100 and 106 is possible, and thus vertical movement between the end of the closed side piler and the beginning of the rear carrier assembly 36 is possible. This vertical movement need not be prohibited, however, since cane can be successfully transferred from the closed side piler to the rear carrier assembly as long as relative movement between these components in the horizontal plane is not possible (or is extremely limited). Cylinder 98 may be actuated by a conventional control within the operator cab 18.

According to the method of the invention, at least two rows of cane are simultaneously harvested with a four wheel harvester by propelling the harvester along first and second cane rows such that a pair of front harvester wheels are each positioned on opposite sides of the first and second cane rows, and a pair of rear harvester wheels are each positioned on opposite sides of the same first and second cane rows and are substantially aligned behind the respective front wheels. The cane is collected and positioned at the front end of the harvester in a manner similar to prior art techniques. The base of the collected and positioned cane is cut to separate the cane from the ground. The cut cane is carried rearward within the harvester while in a substantially erect position through respective first and second pathways each passing between the pair of front wheels and then outward between the respective front and rear wheels. When passing outward between the wheels, a foot carrier holds the position of the foot of the cane in place below the middle of the cane stalks.

When cutting the initial rows of cane, the cylinders 92, 92A are retracted so that the side pilers are in the closed position, and the cylinders 98 are also activated to interconnect the pressure rails in that closed position. Drive units 78, 78A thus pass cane to the closed side pilers, and the foot of the cane is controlled when passing between the front and rear wheels by the foot conveyor 86, which is powered by the hydraulic motors 77, 77A. With the hydraulic motors 79, 79A activated, the rear carrier assemblies receive the substantially erect cane from the closed side pilers, and this transition between each closed side piler and the respective rear carrier assembly is made in a substantially straight line manner to minimize cane loss. Cane is moved inwardly toward the first and second cane rows a distance of at least three fourths the transverse space between the first and second cane rows before the rear piler 74 releases the cut cane in a common cane row. The cane accordingly need not be tripped behind the harvester. As previously explained, the rear carriers be pivotably controlled from a short cane position substantially transverse to the first and second cane rows 6 to a tall cane position substantially inclined with respect to the short cane position in response to the length of the cane. This control may be accomplished automatically by sensing the height of the cane toppers, and automatically controlling the hydraulic cylinders 75, 75A in response to signals from the topping sensor. In this manner, the initial rows of a cane field may be cut so that cut cane is stacked in a common heap row with the stacked cane generally transverse to the cane rows 6 and is spaced between each of the initial cut cane rows 6.

In order to harvest the alternate fly rows, the cylinders 98 may first be retracted to unlock the side piler assemblies, and the cylinders 92 thereafter activated to power the side pilers to the opened position. When harvesting the fly rows, the drive units 79, 79A need not be powered in order to minimize wear on the rear carrier assemblies and the rear pilers. With the side pilers in the opened position, the fly rows may then be harvested and the cane from each of the fly rows will be transported outward between the respective front and rear wheels, and deposited on an existing cut cane rows on either side of the harvester by the respective side pilers. When cutting the fly rows, the speed which the cut cane moves within the pair of opened side piler assemblies may be controlled relative to the speed of the harvester moving through the field in order to release the cane on the existing cut cane rows in a manner substantially transverse to the cane rows 6. Each of the four wheels of the harvester may be individually powered by a separate hydraulic motor, and the harvester may be easily and reliably steered by the operator using a conventional solid axle rear wheel steering system. During harvesting of the cane, the vertical position of the gatherers and the toppers, as well as the position of the cane cutters, will also be controlled by the operator.

It is a particular feature of the present invention that the harvester rear piler assemblies are each provided with a cane steering bar 120 as shown in FIGS. 1 and 2. Cane within the rear carrier portion 36 is not moving substantially relative to the ground when the machine is normally operating, since the cane is moving in the conveyor system relative to the harvester frame at a speed substantially the same as the speed of the harvester frame relative to the ground, although the directions are opposite. Although there is no substantial relative movement of the cane and the ground at this time, the foot of cane at this time is still supported by the adjacent hill of the row outward of the tires, so that cane which does not extend up to the height of the rear carrier portion 36 is still supported in position by this adjacent hill and by engagement with the stalks and leaves of the cane which does extend to the rear carrier portion. As the cane moves laterally toward the centerline of the machine and away from this hill, it is possible for leaves and the stalks of the cane which are supported by the carrier system to support for a short distance the cane which is broken beneath the carrier system. After the cane passes a short distance past the sprocket 68, however, and before the cane reaches the sprocket 72, those stalks of cane which do not extend to the carrier system would normally not engage any force which would tend to move those stalks more toward the centerline of the machine or more "forward" with the supported cane moving with the harvester, and accordingly the short or broken cane stalks would tend to fall on the ground at that point and not be properly laid down for picking up subsequently by the loader. To overcome this problem, those short and broken stalks of cane are subjected by the bar 120 to a force which moves those broken cane stalks, approximately at the carrier chain speed, in a direction traverse to the growing cane rows, i.e., in a direction that the remaining cane stalks which are supported by the rear pilers are moving. Also, the bar 120 moves the short or unsupported cane "forward" at the speed of the harvester, so that little or no relative movement occurs along the centerline 45 between the supported cane and the broken or unsupported cane. Cane steering bar 120 is thus positioned so that it is below the carrier, and so that it contacts the broken and short cane, and supplies the force component which is needed to move the broken cane along with the carried cane so that it will be properly deposited in a direction generally traverse to growing cane rows.

The cane steering bar 120 is thus provided on each of the rear pilers, and serves two important functions: (1) The cane steering bar helps support the foot of the cane as it moves traversely toward the centerline and on its way to being carried across the top of the adjacent furrow. As the supported cane in the rear piler starts to move across the furrow, the foot of the supported cane stalks engage the cane steering bar which support these supported cane stalks so that the foot of the supported cane does not lag behind the center of the stalks, grasped by the conveyor system, so that the supported cane will be properly deposited in a direction generally traverse to the growing cane rows. (2) The cane steering bar also deflects cane which is either broken beneath the carrier or which was not lifted high enough to reach the carrier, so that the broken cane stalks, which are generally tangled in the leaves of the supported cane, will also be properly moved onto the heap row with the cane supported by the conveyor system, and at approximately the same velocity and direction as the supported cane attributable to the movement of the harvester and, if the steering bar 120 is angled, the direction of carrier movement. If the cane steering bar was not utilized, this broken or short cane might separate from the cane which is supported as the supported cane changes directions at the rear piler, and the broken cane would not be picked up by the loader. The cane steering bar thus substantially minimizes the amount of cane left in the field, thereby substantially improving the efficiency for the farmer while still minimizing the amount of mud which is transported with the cane to the processing plant.

The cane steering bar is particularly important if the carrier assembly or piler assembly moving cane is angled more than 45° from the harvester centerline, i.e., if directed at least as much or more laterally than in a direction along the harvester centerline. The cane steering bar 120 is preferably flexibly mounted to the harvester frame, and a flexible metal rope portion may be used to connect the forceacting bar to a frame support. The bar 120 is preferably mounted to be positioned vertically at about one half, and generally from one-thirds to two-thirds of the vertical spacing (from the ground) of the grasping assembly, so that broken cane is engaged generally near its mid point.

Cane farmers have traditionally disliked placing the harvested cane back on the ground only to subsequently picked up by a loader, since cane which is deposited on the ground subsequently has to be loaded and this loading typically adds a fair amount of mud to the cane, which then substantially decreases the sugar cane processing efficiency, and accordingly reduces the payments to the cane farmer. The harvester of the present invention, as explained above, carries the cane in a direction generally traverse to the growing cane rows, and most importantly across each of the cane rows when depositing the cut cane behind the machine, so that the properly positioned cane will more likely be picked up by a loader without a great deal of mud. Equally important, the harvester of the present invention does not utilize a center tire which rolls in the furrow between the two rows being harvested. Such a tire, whether placed before or after the pair of tires which straddle the two rows being harvested, inherently "hills up" a good amount of mud and dirt in this center furrow when the harvester is operating in a wet field, so that this picked up mud tends to be loaded with the cane during the subsequent loading operation. Accordingly, the harvester of the present invention has a significant benefit to cane farmers by reducing the amount of cane which is left in the field, and by reducing the amount of mud which is generally loaded with the cane, thereby improving the overall profitability of the cane harvesting operation.

Various modifications and alternations of the harvester described herein will become apparent from the above description. While it is preferable to pass the cane outside of the respective rear wheels in order to efficiently provide for the desired transverse movement of the cane inward when piling the heap row, it may be possible to move the cane through the harvester with the cane traveling past the rear tires in a passageway slightly inward of the rear wheels, while nevertheless still providing substantial transverse movement so that the cane can be effectively carried rather than tripped when piling the heap row. For this alternate embodiment, the side pilers preferably would still be pivotably mounted so that, when opened, they pass cane between the front and the rear wheels to pile cane on existing cut cane rows when harvesting the fly rows. When the side pilers are closed, cane would then be passed to the separately driven rear carrier assemblies which pass cane in a pathway between the rear wheels, but each pathway would be substantially adjacent the inside of the rear wheels. In order to provide the desired transverse movement, each of the rear wheels would be moved outward as far as practical, and accordingly the outside of each rear wheel may be substantially aligned with the outside of the front wheels. Since cane is passed between the rear wheels, a solid axle would not be employed, and other steering mechanisms would be used. Once the cane has passed beyond the rear wheels, it may also be practical to move the cane further outward (beyond the inside of the rear wheels) before moving the cane back inward and releasing the cane, thereby maximizing the transverse movement of the cane and avoiding the problems associated with tripping the cane in the heap row. It should be understood that this embodiment is less desirable than the previously described embodiment, since the solid rear axle cannot practically be employed if cane is passed between the rear wheels, and since it is difficult to obtain the desired transverse movement of the cane inward before releasing the cane in the heap row if the cane is not moved past the rear tires in pathways outside of the rear tires.

The embodiments of the invention as described above and the methods disclosed herein will suggest further modifications and alterations to those skilled in the art. Such further modifications and alternations may be made without departing from the spirit and scope of the invention, which is defined by the scope of the following claims.

What is claimed is:

1. A cane harvester for simultaneously harvesting at least two rows of cane, comprising:

a harvester frame assembly including a harvester front end and a harvester rear end extending between a frame centerline generally aligned between first and second cane rows, a pair of front wheels each positioned on opposite sides of the first and second cane rows, and a pair of rear wheels each positioned on opposite sides of the first and second cane rows and behind the respective front wheels;

first and second gathering assemblies each adjacent at the harvester front end for collecting and positioning cane gathered from the respective first and second cane rows;

one or more topper assemblies adjacent the harvester front end for removing tops from the collected and positioned cane;

one or more bottom cutter assemblies for cutting a base of the collected and positioned cane while within the first and second cane rows to separate the cane from the ground;

first and second front carrier assemblies for carrying the cut cane rearward in respective first and second pathways each passing between the pair of front wheels and then outward between the respective front and rear wheels;

first and second rear carrier assemblies each substantially fixed to the frame assembly at a position opposite the respective rear wheel with respect to the frame centerline for carrying the cut cane toward the rear end of the harvester;

first and second piler assemblies for receiving cane from the respective first and second rear carrier assemblies and for each releasing the cut cane across a common heap row spaced between the first and second cane rows; and third and fourth piler assemblies each selectively movable between an opened and a closed position, such that in the closed position each of the third and fourth piler assemblies operate as an extension of the first and second front carrier assemblies, respectively, to pass cut cane to the respective first and second rear carrier assemblies, and in the opened position each of the third and fourth piler assemblies receives cane from the respective first and second front carrier assemblies and releases cut cane on an existing heap row spaced outwardly of the respective front and rear wheels.

2. The cane harvester as defined in claim 1, wherein each of the first and second piler assemblies moves cane transversely a distance of at least threefourths the transverse space between the first and second cane rows before releasing the cut cane across the heap row.

3. The cane harvester as defined in claim 1, wherein the third piler assembly and the respective rear carrier assembly upstream from the first piler assembly are configured to pass cane in a substantially straight linear path from the closed third piler assembly to the respective rear carrier assembly.

4. The cane harvester as defined in claim 1, further comprising:

one drive mechanism for driving the first piler assembly; and another drive mechanism for driving the third piler assembly.

5. The cane harvester as defined in claim 4, wherein the another drive mechanism also drives the first carrier assembly.

6. The cane harvester as defined in claim 1, further comprising:

a lock mechanism for selectively interconnecting each of the third and fourth piler assemblies when in the closed position to the respective first and second rear carrier assemblies.

7. The cane harvester as defined in claim 6, wherein the lock mechanism further comprises:

a pin fixed horizontally to one of the third piler assembly and the first rear carrier assembly; and a donut member having a central aperture for selectively receiving the pin, the donut member being fixed horizontally to the other of the third piler assembly and the first carrier assembly; and one of the pin and donut member being vertically movable for selective engagement and disengagement of the pin and the donut member.

8. The cane harvester as defined in claim 1, wherein the harvester frame assembly further comprises:

a substantially linear horizontal rear axle interconnecting the pair of rear wheels.

9. The cane harvester as defined in claim 8, wherein the harvester frame assembly further comprises:

a power unit for propelling the cane harvester and including a plurality of drive motors each for driving a respective one of the front and rear wheels; and a steering mechanism for pivoting each of the rear wheels to steer the cane harvester.

10. The cane harvester as defined in claim 1, further comprising:

a cane steering bar adjacent at least one of the first and second piler assemblies for supporting cane unsupported by the respective piler assembly.

11. The cane harvester as defined in claim 1, wherein each of the first and second piler assemblies are pivotably movable from a short cane position substantially transverse to the first and second cane rows to a tall cane position substantially inclined with respect to the short cane position.

12. The cane harvester as defined in claim 11, further comprising:

sensing means for sensing the height of at least one of the one or more topper assemblies; and control means for regulating the pivotable position of at least one of the first and second piler assemblies in response to the sensing means.

13. The cane harvester as defined in claim 11, further comprising:

one drive mechanism for driving the first piler assembly;

another drive mechanism for driving the third piler assembly;

actuation means for selectively deactivating the one drive mechanism independently of the another drive mechanism; and speed control means for regulating the speed of the one drive mechanism and the another drive mechanism such that cut cane moves within each of the first and third of piler assemblies of substantially the same speed when the one drive mechanism is activated.

14. A cane harvester for simultaneously harvesting at least two rows of cane, comprising:

a harvester frame assembly including a harvester front end and a harvester rear end, a pair of front wheels each positioned on opposite sides of the first and second cane rows, and a pair of rear wheels each positioned on opposite sides of the first and second cane rows and behind the respective front wheels, each of the pair of rear wheels being pivotable relative to the frame assembly for steering the cane harvester and being mechanically interconnected by a substantially horizontal frame axle, and a power unit for propelling the cane harvester;

gathering means adjacent the harvester front end for collecting and positioning cane gathered from the respective first and second cane rows;

topping means for removing tops from the collected and positioned cane;

cutter means for cutting a base of the collected and positioned cane while within the first and second cane rows to separate the cane from the ground;

first and second front carrier assemblies for carrying the cut cane while in a substantially erect position rearward in respective first and second pathways each passing between the pair of front wheels and then outward between the respective front and rear wheels;

first and second piler assemblies for receiving cane from the respective first and second front carrier assemblies and for each releasing the cut cane across a heap row spaced between the first and second cane rows; and third and fourth piler assemblies each selectively movable between an opened and a closed position, such that in the closed position each of the third and fourth piler assemblies operate as an extension of the first and second front carrier assemblies, respectively, to receive cane from the respective first and second carrier assemblies and transfer cane to the respective first and second piler assemblies, and in the opened position each of the third and fourth piler assemblies receives cane from the respective first and second front carrier assemblies and releases cut cane on an existing heap row spaced outwardly of the respective front and rear wheels.

15. The cane harvester as defined in claim 14, wherein each of the first and second piler assemblies moves cane transversely a distance of at least three-fourths the transverse space between the first and second cane rows before releasing the cut cane across the heap row.

16. The can harvester as defined in claim 14, further comprising:
a first rear carrier assembly substantially fixed to the frame assembly at a position opposite the respective rear wheel with respect to the frame centerline for carrying the cut cane toward the rear end of the harvesting; and
the third piler assembly and the first rear carrier assembly are configured to pass cane in a substantially straight linear path from the third piler assembly to the first rear carrier assembly.

17. The cane harvester as defined in claim 16, further comprising:
a lock mechanism for selectively interconnecting each of the third piler assembly when in the closed position to the first rear carrier assembly.

18. The cane harvester as defined in claim 17, wherein the lock mechanism further comprises:
a pin fixed horizontally to one of the third piler assembly and the first rear carrier assembly; and
a donut member having a central aperture for selectively receiving the pin, the donut member being fixed horizontally to the other of the third piler assembly and the first carrier assembly; and
one of the pin and donut member being vertically movable for selective engagement and disengagement of the pin and the donut member.

19. A cane harvester for simultaneously harvesting at least two rows of cane, comprising:
a harvester frame assembly including a harvester front end and a harvester rear end, a pair of front wheels each positioned on opposite sides of first and second cane rows, and a pair of rear wheels each positioned on opposite sides of the first and second cane rows and behind the respective front wheels;
gathering means adjacent the harvester front end for gathering cane from the respective first and second cane rows;
cutter means for cutting a base of the collected and positioned cane while within the first and second cane rows to separate the cane from the ground;
first and second front carrier assemblies for carrying the cut cane in respective first and second pathways each passing between the front wheels;
first and second rear carrier assemblies each substantially fixed to the frame assembly for carrying the cut cane toward the rear end of the harvester; first and second piler assemblies for receiving cane from the respective first and second rear carrier assemblies and for releasing the cut cane in a common heap row across a cut cane row spaced between the first and second cane rows;
third and fourth piler assemblies each selectively movable between an opened and a closed position, such that in the closed position each of the third and fourth piler assemblies operate as an extension of the first and second front carrier assemblies, respectively, to pass cane to the respective first and second rear carrier assemblies, and in the opened position each of the third and fourth piler assemblies receives cane from the respective first and second front carrier assemblies and releases cut cane on an existing heap row spaced outwardly of the respective front and rear wheels;
one drive mechanism for driving the first piler assembly;
another drive mechanism for driving the third piler assembly; and
actuation means for selectively deactivating the one drive mechanism independently of the another drive mechanism.

20. The cane harvester as defined in claim 19, further comprising:
a lock mechanism for selectively interconnecting each of the third and fourth piler assemblies when in the closed position to the respective first and second piler assemblies.

21. The cane harvester as defined in claim 19, wherein each of the first and second piler assemblies moves cane transversely a distance of at least three-fourths the transverse space between the first and second cane rows before releasing the cut cane across the heap row.

22. The cane harvester as defined in claim 19, further comprising:
speed control means for regulating the speed of the one drive mechanism and the another drive mechanism such that cut cane moves within each of the first and third of piler assemblies of substantially the same speed when the one drive mechanism is activated.

23. The cane harvester as defined in claim 19, wherein each of the first and second piler assemblies are pivotably movable from a short cane position substantially transverse to the first and second cane rows to a tall cane position substantially inclined with respect to the short cane position.

24. The cane harvester as defined in claim 19, further comprising:
topping means for removing tops from the collected and positioned cane;
sensing means for sensing the height of the topper means relative to the harvester frame; and
control means for regulating the pivotable position of at least one of the first and second piler assemblies in response to the sensing means.

25. A method of simultaneously harvesting at least two rows of cane with a harvester, comprising:
propelling the harvester along first and second cane rows such that a pair of front harvester wheels are each positioned on opposite sides of the first and second cane rows;
collecting and positioning cane gathered from the respective first and second cane rows;
cutting a base of the collected and positioned cane while within the first and second rows to separate the cane from the ground;

carrying the cut cane rearward within the cane harvester while in a substantially erect position through respective first and second pathways each passing between the pair of front wheels and then outward between the respective front and rear wheels;

while a pair of side pilers are in a closed position, receiving cane from the respective first and second pathways and releasing the cut cane across a common heap row spaced between the first and second cane rows;

thereafter moving the side piles to an opened position to receive cane from the respective first and second pathways and release cane on a pair of existing cut cane rows each spaced outward from the respective front and rear wheels; and while the pair of side pilers are in the open position, deactivating a pair of rear pilers for releasing the cut cane across the common heap row.

26. The method as defined in claim 25, further comprising:

selectively interconnecting each of the pair of side pilers when in the closed position to a respective rear carrier upstream from the respective rear piler.

27. The method as defined in claim 25, further comprising:

the step of receiving cane from the respective first and second pathways and releasing the cut cane across a cut cane row spaced between the first and second cane rows includes providing rear carriers for receiving cane from the respective pair of side piler assemblies when in the closed position and passing the cut cane to respective rear pilers; and passing the cut cane between each of the side pilers and the respective rear carriers in a substantially linear manner.

28. The method as defined in claim 25, further comprising:

providing one drive mechanism for driving at least one of the side pilers; and providing another drive mechanism for driving at least one of the rear pilers.

29. The method as defined in claim 25, further comprising:

removing cane tops from the collected and positioned cane;

the step of receiving cane from the respective first and second pathways and releasing the cut cane across a cut cane row spaced between the first and second cane rows includes pivotably moving the pair of rear pilers from a short cane position substantially transverse to the first and second cane rows to a long cane position substantially inclined with respect to the short cane position;

sensing the height cane tops are removed from the collected and positioned cane; and automatically regulating the pivotable position of the rear pilers in response to the sensed topping height.

30. A cane harvester conveyor mechanism for use with a cane harvester for harvesting and laying cut cane on a heap row generally traverse to the harvested cane rows, the harvester including a harvester frame assembly having a centerline parallel with the forward movement of the harvester, a cane gatherer for collecting and positioning cane gathered from the harvested cane rows, a cane cutter for cutting a base of the collected and positioned cane to separate the cane from the ground, a carrier assembly for carrying the cut cane while in a substantially erect position rearward in pathway, and a piler assembly for receiving cane from the carrier assembly and for releasing the cut cane across the heap row, the cane harvester conveyor mechanism comprising:

at least one of the carrier assembly and the piler assembly being at an angle of more than 45 degrees relative to a centerline of the harvester frame for moving cane grasped by the assembly laterally relative to the frame centerline, the assembly grasping the cane at an approximate selected vertical spacing from the ground; and a cane steering bar secured to the harvester frame, the cane steering bar being spaced vertically from the ground a distance of from one-third to two-thirds the vertical spacing of the grasping assembly and being positioned laterally with respect to the grasping assembly for engaging a lower end of cane stalks, such that cane not engaged by the grasping assembly is forced by the cane steering bar over a substantial lateral distance to move with the grasped cane, thereby increasing the amount of short or broken cane properly stacked on the heap row.

31. The cane harvester mechanism as defined in claim 30, wherein the at least one carrier assembly is a piler assembly.

* * * * *